United States Patent [19]

Takahashi et al.

[11] 3,906,378

[45] Sept. 16, 1975

[54] ELECTRONIC CIRCUIT FOR ELIMINATING COINCIDENTAL SIGNAL FROM HYBRID SIGNALS

[75] Inventors: Toshio Takahashi, Honjo; Ryosaku Tagaya, Isezaki; Toshiyasu Ehara, Misato-mura, all of Japan

[73] Assignee: Eisai Co., Ltd., Tokyo, Japan

[22] Filed: June 26, 1974

[21] Appl. No.: 483,363

[30] Foreign Application Priority Data

July 9, 1973 Japan ............................. 48-76597

[52] U.S. Cl. ............................... 328/110; 307/232

[51] Int. Cl.² ....................................... H03K 05/20

[58] Field of Search ............ 307/232; 328/110, 109

[56] References Cited

UNITED STATES PATENTS

| | | | |
|---|---|---|---|
| 3,107,306 | 10/1963 | Dobbie | 328/110 X |
| 3,327,226 | 6/1967 | Nourney | 328/110 X |
| 3,593,161 | 7/1971 | Ritz | 328/110 X |
| 3,764,920 | 10/1973 | Galcik et al. | 328/110 |

*Primary Examiner*—Robert Segal

*Attorney, Agent, or Firm*—Wenderoth, Lind & Ponack

[57] ABSTRACT

Electronic circuit system is provided for detecting anti-coincidental pulse signal or signals by eliminating coincidental pulse signal or signals from hybrid pulse signal which is obtained by the aid of a scanning-type light detector. The circuit system is advantageously utilizable for kinetic information retrieval of a substance under movement.

8 Claims, 13 Drawing Figures

ELECTRONIC CIRCUIT FOR ELIMINATING COINCIDENTAL SIGNAL FROM HYBRID SIGNALS

This invention relates to an electronic circuit system for obtaining a kinetic information by eliminating a coexisting static information. This is effected by the aid of a scanning-type light detector associated with a comparator and the related electric circuits adapted therefor.

More particularly, the present invention is concerned with an electronic circuit system suitable for a kinetic information retrieval of a substance especially a solid substance or substances under movement. The kinetic information is obtained according to the present invention by selectively drawing or taking up the electric signal corresponding to the moving substance or substances under retrieval from the hybrid pulse signal. Said hybrid pulse consists of the pulses appearing, in accordance with said moving substance(s), at indefinite positions throughout the sequential scanning frames, and the pulses appearing recurrently twice or more than two times, in accordance with a static substance, at definite positions throughout the sequential scanning frames.

Here the term "the pulses appearing at indefinite positions throughout the sequential scanning frames" stands for the scanning pulses of an electric signal obtained, for example, by passing through a scanning-type light detector a light which is reflected or hidden by such solid substances under movement as solid particle or particles suspending in a transparent fluid medium. Such pulses do not usually appear at definite positions throughout the sequential scanning frames. Consequently, no coincidence will always occur between said positions, when comparing the scanning frames one another. Thus, the electric signal of such transient pulses is hereinafter called "anti-coincidental pulse signal."

On the contrary, the term "the pulses appearing recurrently twice or more than two times at definite positions throughout the sequential scanning frames" stands for the scanning pulses of an electric signal obtained, for example, by passing through a scannint-type light detector as abovementioned a light which is reflected or hidden by such fixed matters as scars, solid particles and stains of contamination adheared on a substance held without movement. Such pulses will constantly appear at definite positions throughout the sequential scanning frames. As the result, a coincidence is found to exist between said positions when comparing the scanning frames one another. Thus, the electric signal of such pulses appearing at definite positions is hereinafter called "coincidental pulse signal".

By utilizing the electronic circuit system of this invention, it is easy to detect an undesirable foreign solid impurity that might be present in such a transparent container filled with a liquid as an ampoule of a medical liquid.

To carry out the detection of such a solid impurity, the ampoule kept to stand on a fixed position is rotated coaxially. Solid matter(s), if present, may whirl and float up in the column of liquid in the container. The scanning-type light detector provided in the system receives a reflected or hidden light by said solid matter or matters. The signal obtained from the light detector under the circumstances must be a signal of anti-coincidental pulse as above defined. By identifying this anti-coincidental pulse signal by means of the electronic circuit system of the present invention, it is possible to detect foreign solid matters under retrieval.

However, there is an unavoidable difficulty occasionally encountered in carrying out this method for detecting the solid matters. Where a scar or spot such as stain of contamination is present on the internal and/or external surfaces of said transparent container, there will also appear an extra scanning pulse signal. This signal naturally is a coincidental pulse signal to appear concurrently with the anti-coincidental pulse signal caused by the solid matters that may be present in the liquid. This might thus lead to an inaccurate detection. Accordingly, it is necessary to eliminate such an offensive coincidental pulse signal from the resultant hybrid pulse signal in order to obtain said anti-coincidental pulse signal for the purpose of detecting such foreign matter(s) by means of the method based on the abovementioned principle.

The electronic circuit system established by the present invention satisfies completely the abovementioned requirement in carrying out the aforementioned detection of a solid foreign matter, regardless of the presence of scars and/or stains of contamination on the internal and/or external surfaces of said container.

In the accompanying drawings.

Figure 1:
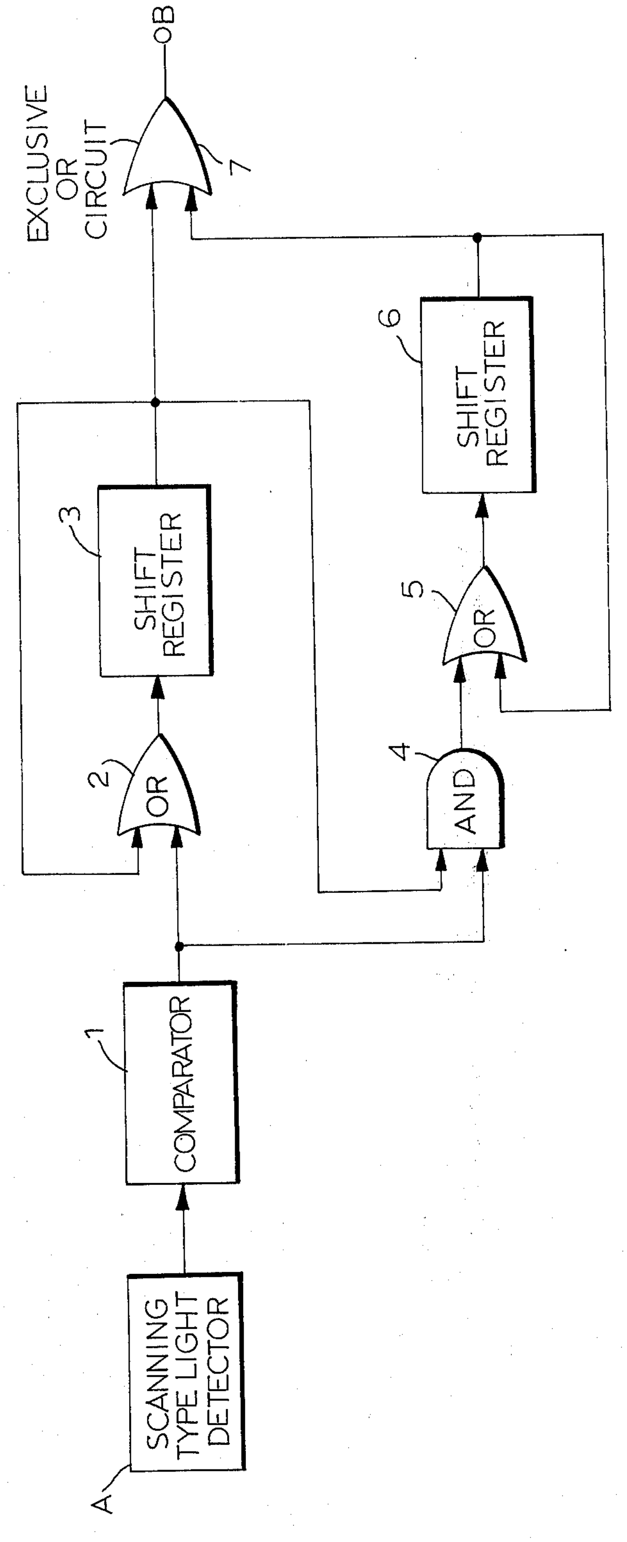
FIGS. 1 and 7 are the illustrative schematic diagrams of the circuit systems according to the present invention.
Figure 7:
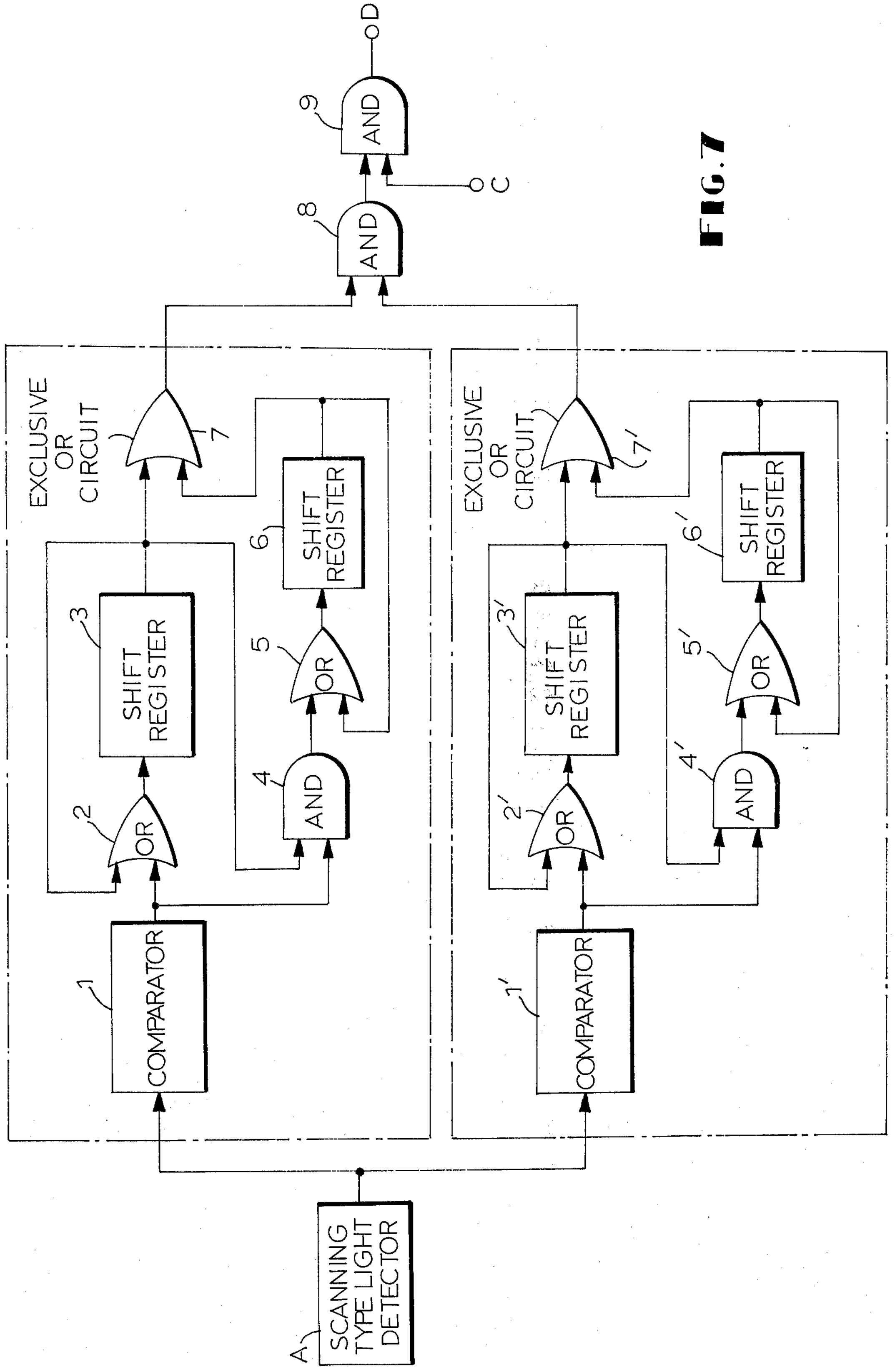

In the electronic circuit systems shown in FIGS. 1 and 7:

A represents a scanning-type light detector;
1 and 1′ are the comparator circuits;
2, 2′, 5 and 5′ are the OR circuits;
3, 3′, 6 and 6′ are the shift register circuits;
4, 4′, 8 and 9 are the AND circuits;
7 and 7′ are the EXCLUSIVE OR circuits;
C is a terminal for adding a gate signal; and
B and D are the terminals for taking up the purposed anti-coincidental signal; and the symbols I, II, III and IV show the first to fourth scanning frames.

In illustrative of one utility embodiment of the circuit system according to the present invention, detection of a solid foreign matter present in a clear medical liquid contained in ampoule will be referred to as follows:

Let it be assumed that the ampoule is made of a transparent glass and contains one scar on its surface. The ampoule as aforementioned is held securely at a position, rotated at a high speed and then stopped the rotation suddenly. Under the condition, the foreign said solid matters may float up in the column of liquid in the ampoule. The scanning-type light detector A suitably arranged will receive the light reflected or shielded by the thus suspending solid matter and produces the output signals composed of one coincidental pulse signal due to one scar present in the ampoule and one anti-coincidental pulse signal due to the solid particle contained in the liquid.

Figure 2:
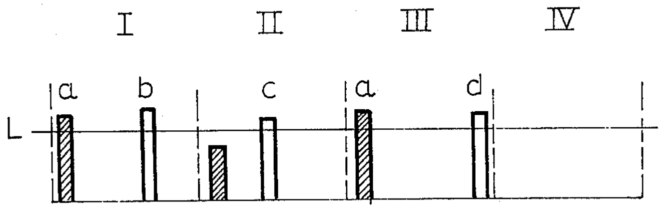
FIGS. 2, 3, 8, 9 and 10 show the hybrid pulse including said anti-coincidental and coincidental pulses in the sequential scanning frames of an electric signal in reference to a given scanning cycle.

Magnitudes of the voltages and the positions of the pulses of said hybrid pulse signal in the first to third scanning frames I, II and III are exemplarily depicted in FIG. 2 wherein only three scanning frames are assumed to be taken for the convenience' sake of simplicity of the illustration. However, it has been found that a scanning-type light detector having a capacity of producing approximately 50 scanning frames is preferable for the assembly of the electronic circuit system used for a commercial practice of the present invention. Of the pulses, *a* represents the coincidental pulse caused by the single scar on the ampoule, which appears at the definite positions common to in the three scanning frames I, II and III, but possess the voltages slightly different from one another, whereas the pulses *b*, *c* and *d*, contrary to the abovementioned coincidental pulse *a*, represent the anti-coincidental pulses caused by the single solid matter, which, as seen in the Figure, display at a respective position in the every scanning frame.

Figure 3:
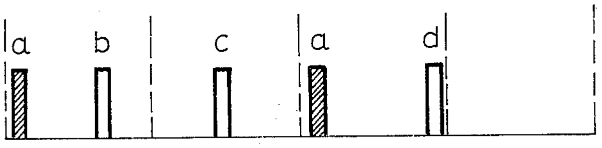
Figure 4:
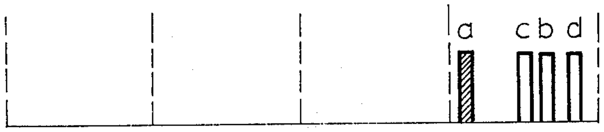
FIGS. 4, 5, 6, 11, 12 and 13 show the pulses including or excluding said anti-coincidental and coincidental pulses in the last scanning frame of said unit scanning cycle.

FIG. 3 shows the hybrid pulse of the output signals of said comparator 1 in which a comparative voltage has been preset at a definite level corresponding, for example, to the level L in FIG. 2. The hybrid pulse signal is memorized in the shift register circuit 3 through the OR circuit 2. For simplicity, FIG. 4 shows the resultant summarized hybrid pulse signal in the fourth scanning frame, that is, in the last scanning frame of the given scanning cycle.

Figure 5:
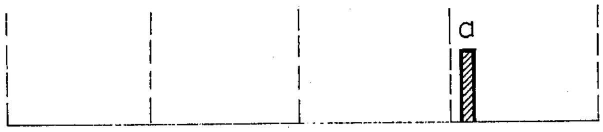
Figure 6:
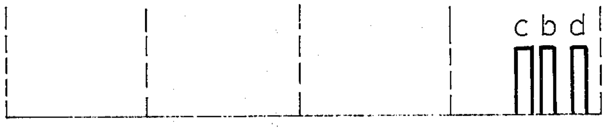

The hybrid output signal from said comparator 1 together with the output signal of the shift register circuit 3 are imposed to the AND circuit 4, and the output signal of said AND circuit is stored, for a moment of one scanning cycle, in the shift register circuit 6 through the OR circuit 5. It will thus be understood that the output signal of the shift register circuit 6 as shown in FIG. 5, is only of a coincidental pulse signal. Then by feeding the output signal of the shift register circuit 3 together with the output of the shift register circuit 6 to the EXCLUSIVE OR circuit 7, the signal due to the scar, i.e., the coincidental pulse *a* or *a* in FIGS. 4 or 5 is thus eliminated, and as the result, only a signal having the anti-coincidental pulses (*c*, *b* and *d*), as shown in FIG. 6, is obtained at the time of the fourth scanning frame IV. These anti-coincidental pulses *c*, *b* and *d* represent the particular case as aforedefined, where there is only one particle of the solid matter in the liquid. From the above explanations, it will be understood therefore that a number of pulses more than those shown in FIG. 6 will be expected, where plural particles of solid matters are present in the liquid.

The scanning-type light detector A used in the circuit of this invention may be a scanning-type photodiode array or an optical fiber-type scanning device, while the shift registers may be the known MOS-type 1,024-bits shift register with 1,024 bits, for example. In practice of inspecting the medical liquid ampoule, it has been found that a shift register having 100 to 1,000 bits may generally be satisfactory. Where a shift register of the type above-mentioned is used, 1,024 units of clock pulses are fed to the shift register circuits 3 and 6 during one frame scanning period. An information in one scanning frame such as that in the first scanning frame I is thus divided into 1,024 sections which are then sequentially memorized or stored in the shift register 3. Following said memorization of the first scanning frame information in the shift register 3, the information of the second scanning frame II is fed one by one to said shift register 3 together with a clock pulse, and at the same time, the information of the first scanning frame I thus stored is recirculated or fed one by one back to said shift register 3 through the OR circuit 2. In this manner, all the output signals of the *n*-scanning frames involved in the unit scanning cycle are successively and superposingly stored in the shift register 3.

Apart from the above, the output hybrid pulse signal of the comparator 1 and the output of the shift register circuit 3 are imposed to the AND circuit 4. The resulting output of said AND circuit 4 is then fed to the shift register circuit 6 through the OR circuit 5. It is to be noted that at the time of the first frame scanning, there is no input to the shift register circuit 6 and that at the time of the second frame scanning, the AND output signals of the first and second scanning frames are first stored in the shift register 6. At the time of the subsequent third scanning, the AND output signals of said third scanning and the OR output signals of the AND output signals are superposingly stored in the shift register 6 in which the AND output signals of the first and second scanning frames as abovementioned have previously been stored.

In this manner, at the time of the *n*-th frame scanning, the sum of the signals of only the coincidental pulses displayed in the *n* scanning frames are superposingly stored in the shift register 6.

Subsequently, the outputs of the shift register circuit 3 and the shift register circuit 6, at the time of the (*n*+1)-th frame scanning, are together fed to the EXCLUSIVE OR circuit 7, and there are obtained selectively the output signals of anti-coincidental pulses which may be taken up at the terminal B.

It may alternatively be possible to selectively take up the intended anti-coincidental signal as the final output signal by adding the output signal at said terminal B to an another AND circuit (not shown in the drawings) to which is being added a gate signal from another terminal at the respective period of scanning of the (*n*+1)-th frame.

Where the circuit system of the present invention is contemplated to be used for a repeated operations in a continuous manner for a certain photometrical inspection such as aforementioned, it is necessary to clear up the stored signals in the shift registers 3 and 6 in the step of preceding operation by interrupting for a certain period the passage of the signals toward the shift registers. The present invention also embraces an embodiment where an appropriate pulse gate circuit is interposed in the circuit system for the purpose of said intermittent interruption of the input to said shift registers so that the system is ready for the following operation. It has been found that such interruptions of the input to the shift registers are effected preferably by interposing an AND circuit between the OR circuit 2 and the shift register 3, and by interposing another AND circuit between the OR circuit 5 and the shift register circuit 6.

According to the above explanation, it is noticed that the elimination of coincidental pulse signal is inoperable with the above-mentioned circuit system of the present invention, unless the coincidental pulse displays concurrently twice or more than two times throughout the all scanning frames of the output of comparator 1.

FIG. 7 shows an alternative schematic diagram of the circuit system of the present invention, in which a pair of the aforementioned circuit systems are arranged in parallel connection to the scanning-type light detector A. According to the circuit system of this diagramatical representation, the coincidental pulse signal can completely be eliminated from the hybrid pulse signal, even if there is only a sole coincidental pulse signal having a voltage up to or exceeding the preset level in the comparator throughout the entire scanning frames of the unit scanning cycle.

In FIG. 7, the referential numerals 1 and 1′; 2 and 2′; 3 and 3′; 4 and 4′; 5 and 5′; and 7 and 7′; and the further marks respectively have the meanings same as those defined to the corresponding numerals in FIG. 1.

Figure 8:
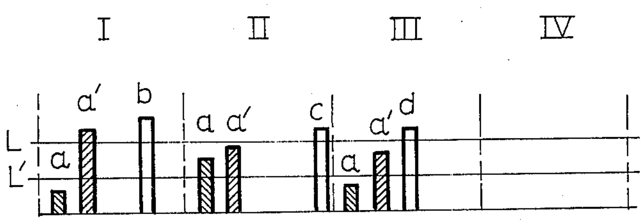
Figure 9:
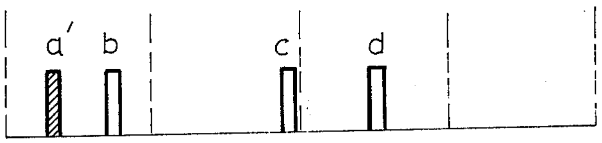

FIG. 8 shows the pulses of the scanning signal that display in the three sequential scanning frames I, II and III of the hybrid signal from the scanning-type light detector A obtained by the use of the circuit system as shown in FIG. 7. Each of the frames, as will be seen in FIG. 8, contains the two coincidental pulses *a* and *a′* having the voltages fairly different from each other, and also one anti-coincidental pulse at the positions represented by *b*, *c* or *d* which have the voltages slightly different from one another. If only a single circuit system as aforementioned is employed for the determinative inspection of said hybrid signal, there is thus likelihood to erroneously interpret that said coincidental signals *a* and *a′* are one anti-coincidental pulse *a′* as shown in FIG. 9, so far as the comparative voltage of the comparator 1 was preset at the level L as shown in FIG. 8.

Figure 10:
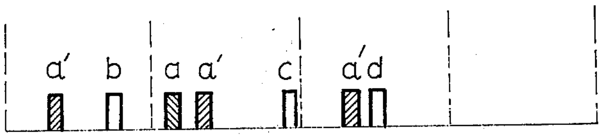
Figure 11:
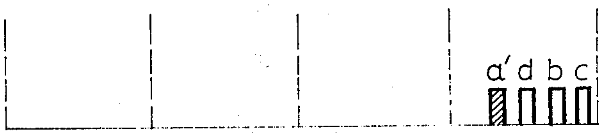
Figure 12:
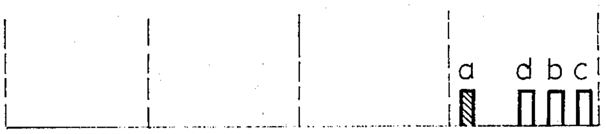

Now, refering to FIGS. 7 and 8, let the comparative voltages of the comparators 1 and 1′ preset at the levels L and L′. When the hybrid pulse signal as shown in FIG. 7 of the output of the light detector A is respectively fed to the comparators 1 and 1′, there will be obtained the output hybrid pulse signal of the comparator 1 as shown in FIG. 9, and the output hybrid pulse signal of the comparator 1′ as shown in FIG. 10, respectively. When these two output hybrid pulse signals are fed respectively to the EXCLUSIVE OR circuits 7 and 7′, there are obtained at the time of the fourth frame scanning, the pulses shown in FIG. 11 with respect to the comparator 1, which involves one coincidental pulse *a′* and three anti-coincidental pulses *d*, *b* and *c;* while at the same time, there are obtained the output hybrid pulses represented in FIG. 12 with regard to the comparator 1′, which involves one coincidental pulse *a* and three anti-coincidental pulses *d*, *b* and *c*. When these output signals of FIGS. 11 and 12 are simultaneously fed to the AND circuit 8, there is obtained the output pulse signal as shown in FIG. 13 at the fourth scanning frame, which as seen from the Figure is assumed only the anti-coincidental pulses *d*, *b* and *c*.

Figure 13:
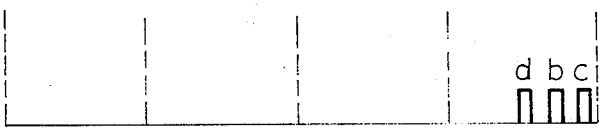

By adding to the signals of the pulses *d*, *b* and *c* an external gate pulse signal from the terminal C to open the AND circuit 9 for only the scanning moment of the fourth frame IV, that is the last scanning frame within the given scanning cycle, there is finally obtained the output consisting only of the anti-coincidental pulse signals at the output terminal D, which is shown in FIG. 13.

From the above explanation with respect to the typical electronic circuit system according to the present invention, it is seen that any coincidental pulse can exhaustively be eliminated from a given hybrid pulse signal contained therein remaining only the anti-coincidental pulse signal.

What is claimed is:

1. An electronic circuit system for eliminating the coincidental pulse or pulses from hybrid pulse consisting of said coincidental pulses and the anti-coincidental pulse or pulses appearing in the scanning frames of an electric signal, comprising:
   a. a comparator for receiving the output signal consisting of said hybrid pulse of a scanning-type light detector;
   b. a first register circuit for receiving through an OR circuit the output of the comparator, and storing, for a period of one scanning cycle, said received output signal;
   c. a circuit for feeding the output of said shift register back to its own input through the OR circuit;
   d. an AND circuit for receiving the output of the comparator together with the output of the first shift register;
   e. a second register circuit for receiving through an OR circuit the output of said AND circuit, and for storing, for a period of one scanning cycle, said received output signal;
   f. a circuit for feeding the output of said second shift register back to its own input, through the OR circuit; and
   g. an EXCLUSIVE OR circuit for receiving the outputs of said first and second shift registers.

2. An electronic circuit system as set forth in claim 1, wherein the additional AND circuits are combined for intermittently interrupting the signal to be fed to the respective shift register.

3. An electronic circuit system as set forth in claim 1, wherein an AND circuit is combined at the position next to the EXCLUSIVE OR circuit, for obtaining the output of anti-coincidental pulses only in the last scanning frame of the unit scanning cycle.

4. An electronic circuit system as set forth in claim 2, wherein an AND circuit is further combined at the position next to said EXCLUSIVE OR circuit.

5. An electronic circuit system for eliminating the coincidental pulse or pulses from hybrid pulse consisting of said coincidental pulses and the anti-coincidental pulse or pulses appearing in the scanning frames of an electric signal, comprising:
   a. two sets of the primary and secondary electronic circuit units conjuncted in the parallel connection to a scanning-type light detector which generates said hybrid pulse signal, said primary and secondary electronic circuit units having the constructions same each other and also the same as that set forth in claim 1 with the proviso that the level of the comparative voltage preset in the comparator of the primary electronic circuit unit differs from that preset in the comparator of the secondary electronic circuit unit; and
   b. an AND circuit for receiving the two outputs of the respective EXCLUSIVE OR circuit of said primary and secondary electronic circuit units.

6. An electronic circuit system as set forth in claim 5, wherein an additional AND circuit is combined respectively with the primary and secondary electronic circuit units for intermittently interrupting the signals to be fed to the respective shift register thereof.

7. An electronic circuit system as set forth in claim 5, wherein an additional AND circuit is combined at the position next to the AND circuit connected to said EXCLUSIVE OR circuit in the system.

8. An electronic circuit as set forth in claim 6, wherein an additional AND circuit is combined at the position next to the AND circuit connected to said EXCLUSIVE OR circuits in the system.

* * * * *